(12) United States Patent
Malatesha et al.

(10) Patent No.: US 10,095,750 B2
(45) Date of Patent: Oct. 9, 2018

(54) ADAPTIVE QUERY PROCESSING

(71) Applicants: Rathnakara Malatesha, Sunnyvale, CA (US); Lana Wong, Belleville, NJ (US); Hiroshi Kitada, Tuckahoe, NY (US)

(72) Inventors: Rathnakara Malatesha, Sunnyvale, CA (US); Lana Wong, Belleville, NJ (US); Hiroshi Kitada, Tuckahoe, NY (US)

(73) Assignee: Ricoh Company, Ltd., Tokyo (JP)

( * ) Notice: Subject to any disclaimer, the term of this patent is extended or adjusted under 35 U.S.C. 154(b) by 227 days.

(21) Appl. No.: 14/995,055

(22) Filed: Jan. 13, 2016

(65) Prior Publication Data

US 2017/0199876 A1    Jul. 13, 2017

(51) Int. Cl.
  *G06F 13/00* (2006.01)
  *G06F 15/00* (2006.01)
  *G06F 17/30* (2006.01)
  *G06F 3/0484* (2013.01)

(52) U.S. Cl.
  CPC ...... *G06F 17/3053* (2013.01); *G06F 3/04842* (2013.01); *G06F 17/30654* (2013.01); *G06F 17/30973* (2013.01)

(58) Field of Classification Search
  CPC .................. G06F 3/0484; G06F 17/30654
  USPC .................. 715/763–765, 741, 748, 851–853
  See application file for complete search history.

(56) References Cited

FOREIGN PATENT DOCUMENTS

| JP | 2001-331490 | 11/2001 |
|----|-------------|---------|
| JP | 2007-249899 | 9/2007  |

OTHER PUBLICATIONS

Jiang Bian et al. Finding the right facts in the crowd; Apr. 21, 2008.*
Eugene Agichtein et al. Finding high-quality content in social media Aug. 2008.*
European Patent Office, "Search Report" in application No. 17150325.3-1952, dated May 24, 2017, 11 pages.
Bian, "Finding the Right Facts in the Crowd" Factoid Question Answering over Social Media, dated 2008, ACM, 10 pages.
Agichtein, "Finding High-Quality Content in Social Media", ACM, dated 2008, 12 pages.

* cited by examiner

*Primary Examiner* — Kevin Nguyen
(74) *Attorney, Agent, or Firm* — Hickman Palermo Becker Bingham LLP; Edward A. Becker

(57) ABSTRACT

A query processing service processes a query pertaining to a question about a client device. The query processing service identifies a subset of answers, from a plurality of answers, which are determined to be most relevant to the query, based upon relevance data for the plurality of answers. The query processing service provides to a client device answer data that includes the subset of answers. The query processing service receives, from the client device, user selection data that specifies a user selection of a particular answer to the question about the client device. In response to receiving the user selection data, the query processing service updates user selection data maintained by the query processing service to include the user selection of the particular answer to the question about the client device. The query processing device may also revise relevance data based upon the update made to the user selection data.

20 Claims, 5 Drawing Sheets

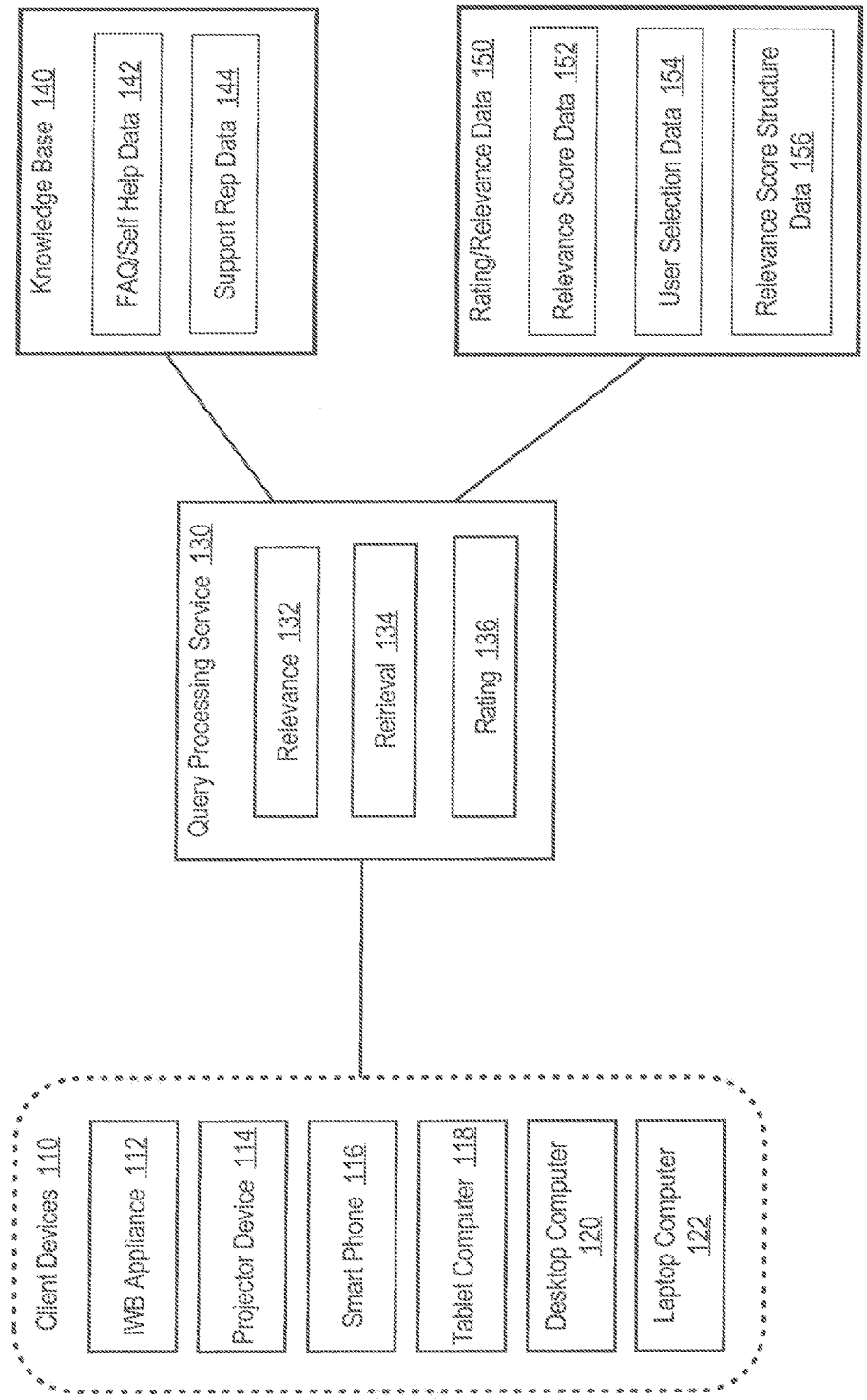

FIG. 2A

Relevance Score Structure Data 156

156a

Answers:
0   Not relevant answer
1   Least relevant answer
2   Average answer
3   Most relevant answer
4   Perfect answer 156b Personnel:
0    Not relevant person
1    Least relevant person to answer
...
35   Average person to answer
80   Most relevant person to answer
99   Best person to answer

FIG. 2B

User Selection Data 154

154a

Answers:
| Answer ID | Number of Selections |
|---|---|
| 10 | 98 |
| 16 | 5 |
| 25 | 67 |
| 50 | 33 |

154b

Personnel:
| User/Rep ID | Number of Responses |
|---|---|
| Jack | 10 |
| Tom | 54 |
| Daniel | 34 |
| Nancy | 5 |

FIG. 2C

User Selection Data Table 200

| Answer ID | Count |
|---|---|
| 10 | 100 |
| 5 | 300 |
| 30 | 499 |
| 45 | 6 |

FIG. 2D

| Query | Relevance Score Data 152 | | | |
|---|---|---|---|---|
| | Answer ID | Relevance Score | Answer ID | Relevance Score |
| How to start the interactive whiteboard appliance? | 4 | 4 | 3 | 2 |
| How to fix an MFP paper jam? | 10 | 0 | 9 | 3 |

FIG. 2E

"How to change font?", "3", "3", "4", "4"
"How to recognize OCR?", "5", "4"
"How to change the text color?", "4", "4"
"How to start a remote meeting?", "7", "4"

FIG. 2F

| Knowledge Base Data Table 210 | | | | |
|---|---|---|---|---|
| ID | Contact | System | Title | Answer/Information |
| 1 | Bob | IWB | Starting the IWB | <Detailed answer for starting the IWB> |
| 2 | Sue | MFP | MFP crash | <Detailed answer for MFP crash> |
| 3 | Jim | Kiosk | System boot | <Detailed answer for booting kiosk> |

# ADAPTIVE QUERY PROCESSING

FIELD OF THE INVENTION

Embodiments relate generally to processing queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users of client devices, such as printers, scanners, multi-function peripherals (MFPs), interactive whiteboard (IWB) appliances, projectors, etc., often have questions about the operation of these devices. For example, users may have questions about particular features or the meaning of error codes. Some of these devices allow a user to use the control panel of the device to access a user manual or frequently asked questions (FAQ) document to obtain an answer to a question or to obtain information about a feature of the device. These devices may also allow a user to enter a query to access a knowledge base of information pertaining to a particular device.

One of the issues with these approaches is that the information provided to users is often static and not updated in response to user feedback. For example, for some client devices, user manuals and FAQs are often prepared prior to the product release and may rarely be updated, even when the information is available via the Internet. Similarly, answers to queries are often static and do not change over time. These issues also apply to information provided to users from customer support services. Customer support personnel are typically selected from a queue based upon availability and provide answers to questions from static information that is similar to the information found in user manuals and FAQs.

SUMMARY

An apparatus includes one or more processors, one or more memories communicatively coupled to the one or more processors and a query processing service executing on the apparatus. The query processing service receives a query pertaining to a question about a client device and in response, retrieves relevance score data that specifies a relevance score for each answer to the question about the client device from a plurality of answers to the question about the client device. The query processing service selects, from the plurality of answers to the question about the client device, based upon the relevance score data, a subset of answers to the question about the client device and obtains, from a knowledge base, answer data that includes the subset of answers to the question about the client device. The query processing service generates and transmits over the one or more networks to a client device, the answer data that includes the subset of answers to the question about the client device. The query processing service receiving, from the client device, user selection data that specifies a user selection of a particular answer to the question about the client device from the subset of answers to the question about the client device, and in response, updates user selection data for the particular answer to the question about the client device, and updates the relevance score data for the particular answer to the question about the client device.

BRIEF DESCRIPTION OF THE DRAWINGS

In the figures of the accompanying drawings like reference numerals refer to similar elements.

FIG. 1 is a block diagram that depicts an arrangement for processing queries.

FIG. 2A depicts an example embodiment of scoring structure data that specifies one or more structures and/or scales for assigning relevance values to answers.

FIG. 2B depicts an example embodiment of user selection data that tracks user selections of particular information provided in response to queries.

FIG. 2C depicts an example implementation of user selection data in the form of a user selection data table.

FIG. 2D depicts an example embodiment of relevance score data that specifies relevance scores for information stored in knowledge base.

FIG. 2E depicts an example implementation of relevance score data in comma separated values (CSV) format.

FIG. 2F depicts knowledge base in the form of a knowledge base data table.

DETAILED DESCRIPTION

Figure 3:
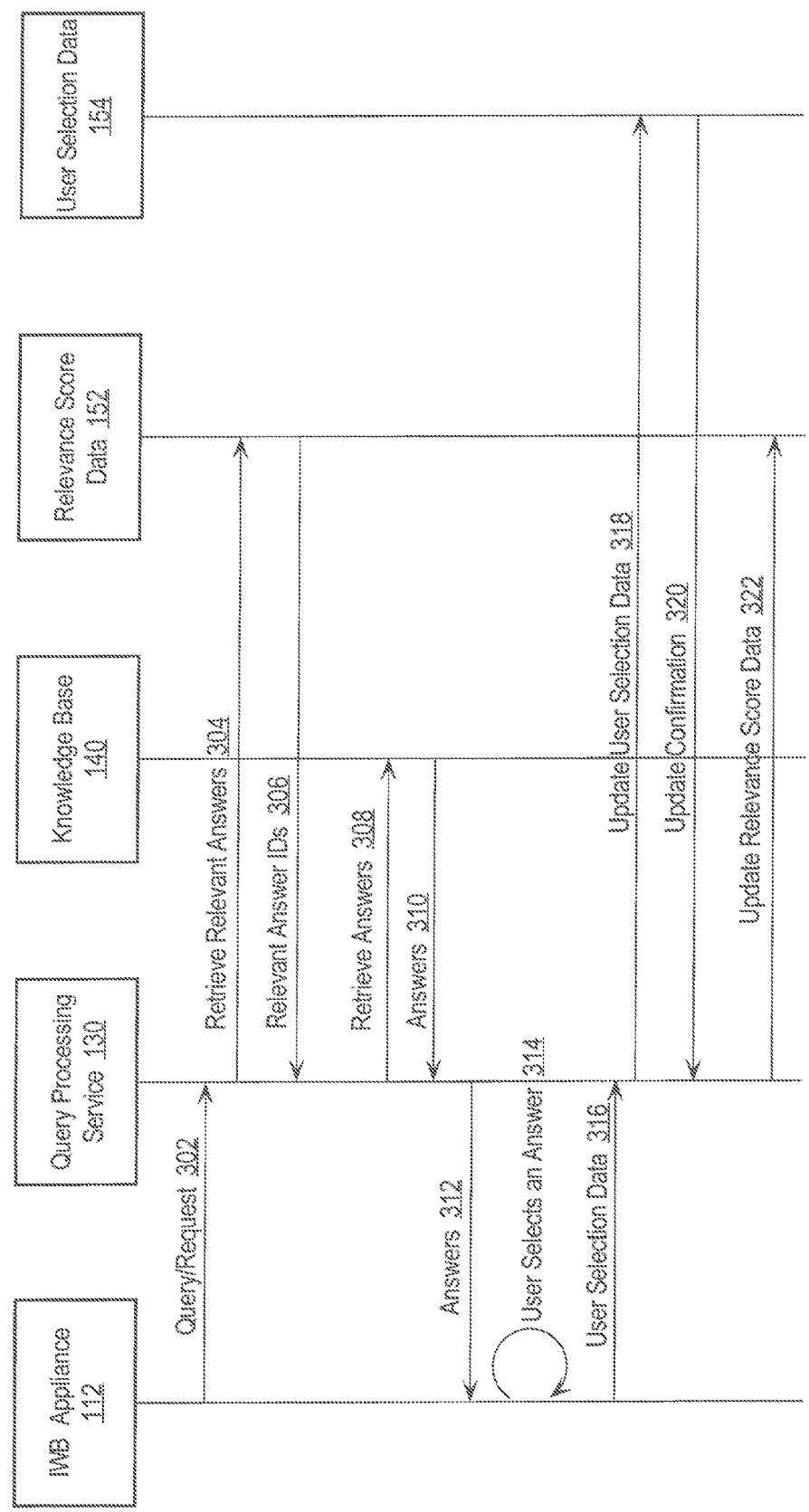
FIG. 3 is a flow diagram that depicts an example message and data flow during adaptive query processing.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
    II. SYSTEM ARCHITECTURE
    III. RATING/RELEVANCE DATA AND KNOWLEDGE BASE
    IV. ADAPTIVE QUERY PROCESSING
    V. IMPLEMENTATION MECHANISMS

I. Overview

A query processing service processes a query pertaining to a question about a client device. The query processing service identifies a subset of answers, from a plurality of answers, which are determined to be most relevant to the query, based upon relevance data for the plurality of answers. The query processing service provides to a client device answer data that includes the subset of answers. The query processing service receives, from the client device, user selection data that specifies a user selection of a particular answer to the question about the client device. In response to receiving the user selection data, the query processing service updates user selection data maintained by the query processing service to include the user selection of the particular answer to the question about the client device. The query processing device may also revise relevance data based upon the update made to the user selection data. The approach improves relevancy over time of otherwise static information by including user selection of answers and updating relevancy data. The approach is also applicable to providing customer services. More specifically, the query processing service may improve the relevancy of customer service representatives that are selected to respond to an inquiry instead of merely selecting customer service representatives based upon availability.

II. System Architecture

FIG. 1 is a block diagram that depicts an arrangement 100 for processing queries. Arrangement 100 includes client devices 110, a query processing service 130, a knowledge base 140 and rating/relevance data 150. Client devices 110, query processing service 130, knowledge base 140 and rating/relevance data 150 may be communicatively couple via one or more networks including, for example one or more wired or wireless networks, such as local area networks (LANs), wide area networks (WANs), the Internet, as well as one or more direct connections. In addition, although the elements of FIG. 1 are depicted and described herein as being separate, this is done for explanation purposes only and the elements of FIG. 1 may be combined in any manner. For example, knowledge base 140 and rating/relevance data 150 may be hosted and managed by query processing service 130. Alternatively, knowledge base 140 and rating/relevance data 150 may be hosted and managed by query processing service 130 may be stored and managed external to query processing service 130 and access remotely by query processing service 130. As another example, query processing service 130, knowledge base 140 and rating/relevance data 150 may be implemented on one or more client devices 110. Arrangement 100 is not limited the particular elements depicted in FIG. 1 and may include fewer or additional elements depending upon a particular implementation.

Client devices 110 include an IWB appliance, a projector device 114, a smart phone 116, a tablet computer 118, a desktop computer 120 and a laptop computer 122. Embodiments are not limited to any particular type of client device and the types of client devices depicted in FIG. 1 and described herein are provided as examples. Arrangement 100 is depicted in the figures and described herein as having six client device 110, but embodiments are applicable to any number of client devices.

Knowledge base 140 includes information that is provided to a client device in response to a query. The information may include any type of information that may vary depending upon a particular implementation. Examples of information include, without limitation, answers to questions and information used by, or provided by, customer service representatives. Examples of information used by, or provided by, customer service representatives include, without limitation, answers to questions that the customer service representatives posted on online forums or provided in online chatrooms. In the example depicted in FIG. 1, knowledge base 140 includes FAQ/self help data 142 and support rep data 144.

Rating/relevance data 150 includes data that is used to select particular information from knowledge base 140 that is provided by query processing service 130 in response to a query. Rating/relevance data 150 also includes data that is revised by query processing service 130 over time to improve the relevance of information provided in response to queries. In the example depicted in FIG. 1, rating/relevance data 150 includes relevance score data 152, user selection data 154 and relevance score structure data 156. User selection data 154 tracks user selections of particular information provided in response to queries. Relevance score data 152 specifies relevance scores for information stored in knowledge base 140. Relevance scores are determined based upon user selection data 154 and relevance score structure data 156 that specifies a relevance score structure and/or a scale for assigning relevance values to answers, as described in more detail hereinafter.

Query processing service 130 is configured to perform various functionality that are depicted generally in FIG. 1 and categorized as relevance 132, retrieval 134 and rating 136. This functionality is described in more detail hereinafter. Query processing service 130 is configured to process queries received from client devices and provide information that is responsive to the queries. According to one embodiment, query processing service 130 uses rating/relevance data 150 to process queries against knowledge base 140, which is described in more detail hereinafter. According to one embodiment, query processing service 130 is configured to create and manage rating/relevance data 150 and knowledge base 140. This may include, for example, query processing service 130 providing adaptive query processing by updating the user selection data 154 and the relevance score data 152, when appropriate, over time to improve the relevance of information provided in response to queries. Query processing service 130 may store and manage knowledge base 140 and rating/relevance data 150 on a storage, for example, in one or more volatile and/or non-volatile storage that is local to where query processing service 130 is instantiated, or remote from where query processing service 130 is instantiated. Query processing service 130 may be implemented by discrete hardware components, computer hardware, computer software, or any combination thereof.

III. Rating/Relevance Data and Knowledge Base

The adaptive query processing approach described herein includes the use of rating/relevance data 150 to select a subset of answers to a question about a client device, from a plurality of answers. The selected subset of answers are then retrieved from knowledge base 140 and provided to the client device that made the query.

FIG. 2A depicts an example embodiment of relevance score structure data 156 that specifies one or more structures and/or scales for assigning relevance values to answers. In the example depicted in FIG. 2A, relevance score structure data 156 includes two types of relevance score structure data 156a, 156b. Relevance score structure data 156a provides a numerical scale of 0-4 for assigning relevance values to answers to questions, where a relevance value of 0 indicates that an answer is not relevant, and therefore has the lowest relevance, while a relevance value of 4 indicates that an answer is a perfect answer, and therefore has the highest relevance.

Relevance score structure data 156b provides a numerical scale of 0-99 for assigning relevance values to personnel, which may represent, for example, customer service personnel. A relevance value of 0 indicates that a particular personnel is not relevant, and therefore has the lowest relevance, while a relevance value of 99 indicates that the personnel is the best person to answer, and therefore has the highest relevance.

FIG. 2B depicts an example embodiment of user selection data 154 that tracks user selections of particular information provided in response to queries. In the example depicted in FIG. 2B, user selection data 154 includes two types of user selection data 154a, 154b. User selection data 154a specifies a number of selections made by users for each answer ID that corresponds to a particular answer to a question about a client device. For example, the first row of user selection data 154a specifies that the answer corresponding to answer ID "10" was selected 98 times by users. The second row of user selection data 154a specifies that the answer corresponding to answer ID "16" was selected only five times by users. Thus, the number of selections for each answer ID represents a selection count.

User selection data 154b specifies a number of response made by each user/rep (representative) ID that corresponds to a particular user/representative, such as a customer service representative. The responses may be, for example, answers provided during online support sessions or on online forums. For example, the first row of user selection data 154b specifies that the user/representative corresponding to user/rep ID "Jack" provided 10 responses. The second row of user selection data 154b specifies that the user/representative corresponding to user/rep ID "Tom" provided 54 responses.

User selection data 154 may be stored in any format and/or structure, depending upon a particular implementation, and embodiments are not limited to any particular format and/or structure. FIG. 2C depicts an example implementation of user selection data 154 in the form of a user selection data table 200. In user selection data table 200, each row corresponds to an answer and includes an Answer ID for the answer and a count. In this example, the count specifies a number of times that the answer, which corresponds to the Answer ID, was selected by a user. User selection data 154 may be generated and revised by query processing service 130. For example, query processing service 130 may add a new entry to user selection data 154 when new answers are created and set the number of selections to zero. Thereafter, whenever the new answer is selected by a user, the query processing service 130 increments the number of selections for the new answer in the user selection data 154.

FIG. 2D depicts an example embodiment of relevance score data 152 that specifies relevance scores for information stored in knowledge base 140. In this example, the "information" is answers to questions about a client device. Each row of the relevance score data 152 includes a query and a plurality of answers for the query. Each answer is identified by an Answer ID and has a relevance score. For example, the first row of relevance score data 152 corresponds to the query "How to start the interactive whiteboard appliance" and includes a relevance score for answers. The answer having an Answer ID of "4" has a Relevance Score of "4", while the answer having an Answer ID of "3" has a Relevance Score of "2". In this example, based upon relevance score structure data 156, the answer having an Answer ID of "4" has a relevance of "Perfect Answer," while the answer having an Answer ID of "3" has a relevance of "Most relevant answer." Each question is depicted in FIG. 2C as having two answers for purposes of explanation only, and questions may have any number of answers that may vary depending upon a particular implementation.

Relevance scores may be determined using a wide variety of techniques that may vary depending upon a particular implementation. According to one embodiment, the user selection data 154 is used to rank answers and relevance scores are assigned based upon the rankings. For example, the highest ranking answer(s) are assigned the highest relevance score, e.g., "4" and the lowest ranking answer(s) are assigned the lowest relevance score, e.g., "0". Answers with intermediate rankings may be assigned an intermediate relevance score, e.g., "1", "2" or "3". As another example, relevance scores may be assigned based upon percentile rank. Given five relevance levels, as depicted in the relevance score structure data 156, the top 20% of answers, in terms of ranking, would be assigned a highest relevance score of "4", representing perfect answers. The next 20% of answers would be assigned the next highest relevance score of "3", representing a most relevant answers. In the same manner, the third highest 20% of answers would be assigned a relevance score of "2", representing average answers, the fourth highest 20% of answers would be assigned a relevance score of "1", representing least relevant answers, and the lowest 20% of answers would be assigned a relevance score of "0", representing non-relevant answers. These approaches may also be used to determine relevance scores for personnel. Any number of relevance levels may be used, depending upon a particular implementation, and embodiments are not limited to any particular number of relevance levels. Various other techniques may be employed to determine and/or assign relevance scores to answers and/or personnel. Although relevance scores are depicted in the figures and described herein in the context of numerical values, relevance scores are not limited to numerical values and other types of data may be used. For example, alphanumeric classifications, e.g., "A", "B", "C", etc., may be assigned to questions and/or personnel to indicate relevance.

Relevance score data 152 may be stored in any format and/or structure, depending upon a particular implementation, and embodiments are not limited to any particular format and/or structure. FIG. 2E depicts an example implementation of relevance score data 152 in comma separated values (CSV) format. In this example, each row of data corresponds to a question about a client device and includes any number of value pairs, where each value pair corresponds to an answer and specifies an Answer ID and a relevance score. For example, the first row corresponds to the question "How to change font?" and includes two value pairs that correspond to two answers to the question "How to change font?" The first value pair specifies an Answer ID of "3" and a relevance score of "3". This means that the answer having an Answer ID of "3" has a current relevance score of "3", which according to relevance score structure data 156, means that this answer is an average answer. The second value pair specifies an Answer ID of "4" and a relevance score of "4". This means that the answer having an Answer ID of "4" has a current relevance score of "4", which according to relevance score structure data 156, means that this answer is a perfect answer.

FIG. 2F depicts knowledge base 140 in the form of a knowledge base data table 210. Knowledge base 140 data be in any format or structure that may vary depending upon a particular implementation and embodiments are not limited to knowledge base 140 being in any particular format or structure. In the example depicted in FIG. 2F, each row of knowledge base data table 210 corresponds to an answer to a question and specifies an identifier (ID) for the answer, a contact, a system to which the question and answer apply, a title of the question and an answer and/or information for the question. For example, the first row of knowledge base data table 210 has an ID of "1", a contact of "Bob", pertains to an IWB, pertains to a question about the IWB "Starting the IWB" and includes a detailed answer and/or information that addresses the question "Starting the IWB." Knowledge base data table 210 is depicted in FIG. 2F has containing answers and/or information for three different questions pertaining to client devices, but this is provided for explanation purposes only and knowledge base data table 210 may have any number of rows and may have multiple answers/information for a single question.

Knowledge base data table 210 may be generated and maintained by query processing service 130. For example, the pseudo code in Table I below may be used to add an entry to knowledge base data table 210.

TABLE I

```
{
"add": {
   "doc": {
      "id": 1, "system":"iwb",
      "contact":"Bob",
         "title":"starting the IWB",
         "answer":"Power on the IWB from the front panel.
            The IWB has two modes, install and user mode.
            If the IWB boots to the install mode, then select
            the 'Exit Install Mode' button and the IWB
            will be restarted"
   }
},
```

IV. Adaptive Query Processing

According to one embodiment, query processing service 130 is configured to adapt to user selection of answers to improve the subsequent selection of answers to questions. This includes updating user selection data 154 to increment the number of selections in response to user selections of answers and also the relevance score data 152, if appropriate. For example, in response to data indicating a user selection of the answer having an answer ID of "10", query processing service 130 revises the count in user selection data table 200 from "100" to "101". In the same manner, query processing service 130 may update a count for personnel when the personnel provide responses, for example, during online support sessions or forums.

FIG. 3 is a flow diagram 300 that depicts an example message and data flow during adaptive query processing. In step 302, IWB appliance 112 generates and transmits a query/request to the query processing service 130. In this example, it is assumed that the query/request pertains to IWB appliance 112. For example, the query/request may pertain to a feature of IWB appliance 112. The query/request may be generated in different ways that may vary depending upon a particular implementation. For example, a user of IWB appliance 112 may formulate and submit a query via an operations panel of the IWB appliance 112. The query/request may be transmitted over one or more networks to query processing service 130.

In step 304, query processing service 130 receives the query/request from IWB appliance 112 and in response to receiving the query/request from IWB appliance 112, in step 306 retrieves relevant answer IDs for the query using the relevance score data 152. According to one embodiment, this includes identifying the N number of the most relevant answers using the relevance score data 152, e.g., the N number of answers that have the highest relevance scores. For example, query processing service 130 may examine relevance score data 152, as depicted in FIG. 2D or 2E, to locate the query/request and then identify the N number of answers for the query/request that have the highest relevance scores.

In steps 308 and 310, the query processing service 130 retrieves the answers that correspond to the answer IDs. This may be done by the query processing service 130 using the answer IDs to retrieve answer data that includes the text of the N number of answers for the query/request that have the highest relevance scores from knowledge base 140. The value for N may be specified in the query/request provided by IWB appliance 112, or the value may be specified in other ways. In addition, the value for N may change on a per client basis and/or a per request basis. For example, different client devices may request a different number of answers based upon, for example, the number of answers that can be displayed on an operations panel, etc. As another example, a single client may request a different number of answers in different requests. As yet another example, query processing service 130 may be configured with a specified value by an administrator or by configuration data that is used by the query processing service 130. The value of N may be selected to reduce the number of computational resources and network traffic required to provide the answers.

In step 312, query processing service 130 provides to the IWB appliance 112 the N number of answers for the query/request that have the highest relevance scores. The answers may be provided to IWB appliance 112 using a wide variety of techniques that may vary depending upon a particular implementation. For example, the answer data obtained in steps 308 and 310 may be provided in a message that contains data in CSV format, similar to FIG. 2E. Query processing service 130 may also provide, to the IWB appliance 112, data that specifies the answer IDs for the answers. In response to receiving the N number of answers for the query/request that have the highest relevance scores, IWB appliance 112 may display the answers on an operations panel of the IWB appliance 112. For example, IWB appliance 112 may display the answers in a list and include controls that allow a user to select a particular answer from the list.

In step 314, a user of the IWB appliance 112 selects a particular answer and in step 316, IWB appliance 112 transmits, to query processing service 130, user selection data that indicates the selected answer. This data may specify the answer ID for the selected answer and/or may include the selected answer itself.

In response to receiving the user selection data from IWB appliance 112 that indicates the selected answer, in step 318, the query processing service 130 updates the user selection data 154 maintained by the query processing service 130 to include the user selection of the particular answer. This may include, for example, incrementing the number of selections in the user selection data 154, or the count in the user selection data table 200, for the selected answer. The number of selections in the user selection data 154, or the count in the user selection data table 200, for answers may initially be set to zero, and then incremented over time by the query processing service 130. In step 320, query processing service 130 may receive a confirmation that the user selection data was successfully updated. Although embodiments are depicted in the figures and described herein in the context of incrementing the number of selections for answers based upon a response from a client device to which the answer data was sent, embodiments are not limited to this context and the number of selections in the user selection data 154, or the count in the user selection data table 200, may be updated in response to data from other sources. For example, query processing service 130 may be provided with data that specifies user selections of answers from other sources, such as one or more databases, Web servers, etc., and then update the user selection data 154 in response to this data.

In step 322, query processing service 130 updates the relevance score data 152, if appropriate. According to one embodiment, this includes determining whether the change to the user selection data 154 should cause a change to the relevance score data 152. For example, query processing service 130 may determine whether the rankings of answers has changed as a result of updating the user selection data 154. In some situations, a change in the user selection data 154 will cause a change to the relevance score data 152, while in other situations, the relevance score data 152 will not need to be changed. For example, suppose that a particular answer is selected five times in succession, increasing the selection count for the particular answer by five. Suppose further that this increase in selection count makes the total selection count for the particular answer greater than another answer, where the selection count for the particular answer was previously less than the other answer. When the relevance score data 152 is updated in step 322, the particular answer will now be given a higher relevance score and the other answer given a lower relevance score. This will ensure that the relevance score data 152 is updated based upon current user behavior so that user will be supplied with the most relevant answers dynamically. The static knowledge base created during setup starts to learn user behavior and behave dynamically based on the relevance score data 152 and helps users to receive the most relevant answers on the end device. This a powerful mechanism to make the system "Self-learning."

Updating the user selection data 154 and the relevance score data 152 in this manner over time provides a self-learning system that improves the relevancy of answers and other information that are otherwise static. The approach also improves the performance of one or more computing devices on which the approach is implemented for several reasons. Since the relevancy is revised and improved over time, less data needs to be processed by the query processing service 130 and transmitted to client devices, since data that is determined to have low relevancy does not need to be processed and transmitted. In addition, the query processing service does not need to request, from the knowledge base 140, answers that have low relevancy.

V. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
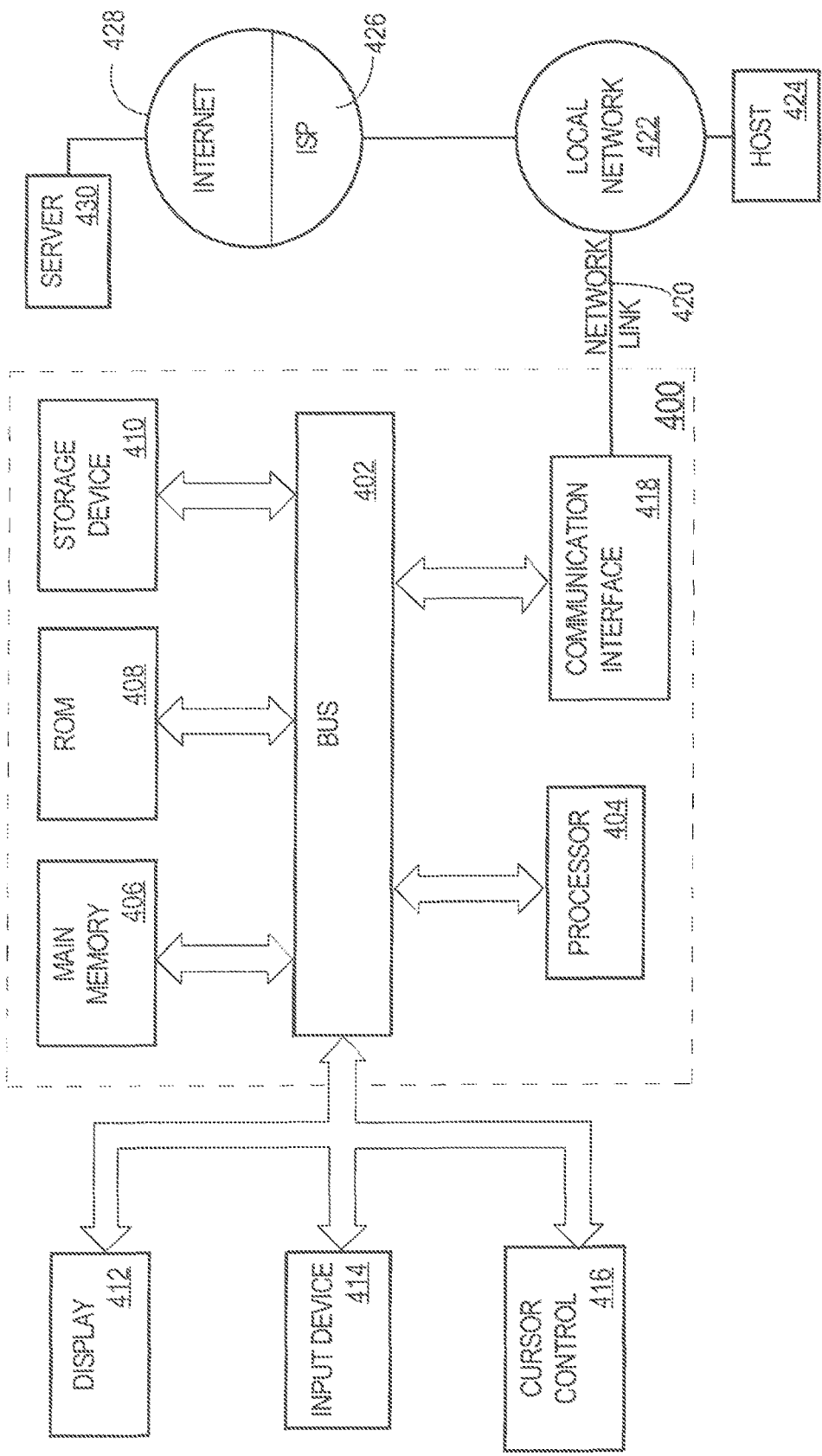
FIG. 4 is a block diagram that depicts an example computer system upon which embodiments may be implemented.

FIG. 4 is a block diagram that depicts an example computer system 400 upon which embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. Although bus 402 is illustrated as a single bus, bus 402 may comprise one or more buses. For example, bus 402 may include without limitation a control bus by which processor 404 controls other devices within computer system 400, an address bus by which processor 404 specifies memory locations of instructions for execution, or any other type of bus for transferring data or signals between components of computer system 400.

An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic or computer software which, in combination with the computer system, causes or programs computer system 400 to be a special-purpose machine. According to one embodiment, those techniques are performed by computer system 400 in response to processor 404 processing instructions stored in main memory 406. Such instructions may be read into main memory 406 from another non-transitory computer-readable medium, such as storage device 410. Processing of the instructions contained in main memory 406 by processor 404 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 400, various computer-readable media are involved, for example, in providing instructions to processor 404 for execution. Such media may take many forms, including but not limited to, non-volatile and volatile non-transitory media. Non-volatile non-transitory media includes, for example, optical or magnetic disks, such as storage device 410. Volatile non-transitory media includes dynamic memory, such as main memory 406. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 404. For example, the instructions may initially be stored on a storage medium of a remote computer and transmitted to computer system 400 via one or more communications links. Bus 402 carries the data to main memory 406, from which processor 404 retrieves and processes the instructions. The instructions received by main memory 406 may optionally be stored on storage device 410 either before or after processing by processor 404.

Computer system 400 also includes a communication interface 418 coupled to bus 402. Communication interface 418 provides a communications coupling to a network link 420 that is connected to a local network 422. For example, communication interface 418 may be a modem to provide a data communication connection to a telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be processed by processor 404 as it is received, and/or stored in storage device 410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by one or more processors, cause:
   a query processing service receiving a query pertaining to a question about a client device,
   in response to the query processing service receiving the query pertaining to a question about a client device, the query processing service:
   retrieving relevance score data that specifies a relevance score for each answer to the question about the client device from a plurality of answers to the question about the client device,
   selecting, from the plurality of answers to the question about the client device, based upon the relevance score data, a subset of answers to the question about the client device,
   obtaining, from a knowledge base, answer data that includes the subset of answers to the question about the client device, and
   generating and transmitting over one or more networks to a client device, the answer data that includes the subset of answers to the question about the client device,
   the query processing service receiving, from the client device, user selection data that specifies a user selection of a particular answer to the question about the client device from the subset of answers to the question about the client device, and
   in response to the query processing service receiving, from the client device, the user selection data that specifies a user selection of a particular answer to the question about the client device from the subset of answers to the question about the client device, the query processing service:
   updating user selection data for the particular answer to the question about the client device, and
   updating the relevance score data for the particular answer to the question about the client device.

2. The apparatus of claim 1, wherein updating the relevance score data for the particular answer to the question about the client device includes comparing a number of user selections of the particular answer to the question about the client device to a number of user selections for each answer to the question about the client device from the plurality of answers to the question about the client device.

3. The apparatus of claim 1, wherein updating the relevance score data for the particular answer to the question about the client device further includes:
   ranking the plurality of answers to the question about the client device based upon a number of user selections for each answer to the question about the client device from the plurality of answers to the question about the client device, and
   determining a relevance score for each answer to the question about the client device from the plurality of answers about the client device based upon the ranking of the plurality of answers to the question about the client device and relevance score structure data that specifies a relevance scoring structure.

4. The apparatus of claim 3, wherein determining a relevance score for each answer to the question about the client device from the plurality of answers about the client device based upon the ranking of the plurality of answers to the question about the client device and relevance score structure data that specifies a relevance scoring structure includes increasing a relevance score for the particular answer to the question about the client device.

5. The apparatus of claim 1, wherein updating user selection data for the particular answer to the question about the client device includes incrementing a selection count for the particular answer to the question about the client device.

6. The apparatus of claim 1, wherein the query processing service is further configured to:
   determine, based upon updating the user selection data maintained by the query processing service to include the user selection of a particular answer to the question about the client device from the subset of answers to the question about the client device from the plurality of answers to the question about the client device, whether the relevance data that specifies the relevance of each answer to the question about the client device from the plurality of answers to the question about the client device needs to be updated, and in response to determining, based upon updating the user selection data maintained by the query processing service to include the user selection of a particular answer to the question about the client device from the subset of answers to the question about the client device from the plurality of answers to the question about the client device, that the relevance data that specifies the relevance of each answer to the question about the client device from the plurality of answers to the question about the client device needs to be updated, then updating the relevance data that specifies the relevance of each answer to the question about the client device from the plurality of answers to the question about the client device.

7. The apparatus of claim 1, wherein the query pertaining to a question about a client device specifies a number of answers in the subset of answers to the question about the client device.

8. One or more non-transitory computer-readable media storing instructions, which, when processed by one or more processors, cause:
   a query processing service executing on a computing device receiving a query pertaining to a question about a client device,
   in response to the query processing service receiving the query pertaining to a question about a client device, the query processing service:
      retrieving relevance score data that specifies a relevance score for each answer to the question about the client device from a plurality of answers to the question about the client device,
      selecting, from the plurality of answers to the question about the client device, based upon the relevance score data, a subset of answers to the question about the client device,
      obtaining, from a knowledge base, answer data that includes the subset of answers to the question about the client device, and
      generating and transmitting over one or more networks to a client device, the answer data that includes the subset of answers to the question about the client device,
   the query processing service receiving, from the client device, user selection data that specifies a user selection of a particular answer to the question about the client device from the subset of answers to the question about the client device, and
   in response to the query processing service receiving, from the client device, the user selection data that specifies a user selection of a particular answer to the question about the client device from the subset of answers to the question about the client device, the query processing service:
      updating user selection data for the particular answer to the question about the client device, and
      updating the relevance score data for the particular answer to the question about the client device.

9. The one or more non-transitory computer-readable media of claim 8, wherein updating the relevance score data for the particular answer to the question about the client device includes comparing a number of user selections of the particular answer to the question about the client device to a number of user selections for each answer to the question about the client device from the plurality of answers to the question about the client device.

10. The one or more non-transitory computer-readable media of claim 8, wherein updating the relevance score data for the particular answer to the question about the client device further includes:
   ranking the plurality of answers to the question about the client device based upon a number of user selections for each answer to the question about the client device from the plurality of answers to the question about the client device, and
   determining a relevance score for each answer to the question about the client device from the plurality of answers about the client device based upon the ranking of the plurality of answers to the question about the client device and relevance score structure data that specifies a relevance scoring structure.

11. The one or more non-transitory computer-readable media of claim 10, wherein determining a relevance score for each answer to the question about the client device from the plurality of answers about the client device based upon the ranking of the plurality of answers to the question about the client device and relevance score structure data that specifies a relevance scoring structure includes increasing a relevance score for the particular answer to the question about the client device.

12. The one or more non-transitory computer-readable media of claim 8, wherein updating user selection data for the particular answer to the question about the client device includes incrementing a selection count for the particular answer to the question about the client device.

13. The one or more non-transitory computer-readable media of claim 8, wherein the query processing service is further configured to:
   determine, based upon updating the user selection data maintained by the query processing service to include the user selection of a particular answer to the question about the client device from the subset of answers to the question about the client device from the plurality of answers to the question about the client device, whether the relevance data that specifies the relevance of each answer to the question about the client device from the plurality of answers to the question about the client device needs to be updated, and
   in response to determining, based upon updating the user selection data maintained by the query processing service to include the user selection of a particular answer to the question about the client device from the subset of answers to the question about the client device from the plurality of answers to the question about the client device, that the relevance data that specifies the relevance of each answer to the question about the client device from the plurality of answers to the question about the client device needs to be updated, then updating the relevance data that specifies the relevance of each answer to the question about the client device from the plurality of answers to the question about the client device.

14. The one or more non-transitory computer-readable media of claim 8, wherein the query pertaining to a question about a client device specifies a number of answers in the subset of answers to the question about the client device.

15. A computer-implemented method comprising:
   a query processing service executing on a computing device receiving a query pertaining to a question about a client device,
   in response to the query processing service receiving the query pertaining to a question about a client device, the query processing service:

retrieving relevance score data that specifies a relevance score for each answer to the question about the client device from a plurality of answers to the question about the client device, selecting, from the plurality of answers to the question about the client device, based upon the relevance score data, a subset of answers to the question about the client device, obtaining, from a knowledge base, answer data that includes the subset of answers to the question about the client device, and generating and transmitting over one or more networks to a client device, the answer data that includes the subset of answers to the question about the client device, the query processing service receiving, from the client device, user selection data that specifies a user selection of a particular answer to the question about the client device from the subset of answers to the question about the client device, and in response to the query processing service receiving, from the client device, the user selection data that specifies a user selection of a particular answer to the question about the client device from the subset of answers to the question about the client device, the query processing service:

updating user selection data for the particular answer to the question about the client device, and updating the relevance score data for the particular answer to the question about the client device.

16. The computer-implemented method of claim 15, wherein updating the relevance score data for the particular answer to the question about the client device includes comparing a number of user selections of the particular answer to the question about the client device to a number of user selections for each answer to the question about the client device from the plurality of answers to the question about the client device.

17. The computer-implemented method of claim 15, wherein updating the relevance score data for the particular answer to the question about the client device further includes:

ranking the plurality of answers to the question about the client device based upon a number of user selections for each answer to the question about the client device from the plurality of answers to the question about the client device, and determining a relevance score for each answer to the question about the client device from the plurality of answers about the client device based upon the ranking of the plurality of answers to the question about the client device and relevance score structure data that specifies a relevance scoring structure.

18. The computer-implemented method of claim 17, wherein determining a relevance score for each answer to the question about the client device from the plurality of answers about the client device based upon the ranking of the plurality of answers to the question about the client device and relevance score structure data that specifies a relevance scoring structure includes increasing a relevance score for the particular answer to the question about the client device.

19. The computer-implemented method of claim 15, wherein updating user selection data for the particular answer to the question about the client device includes incrementing a selection count for the particular answer to the question about the client device.

20. The computer-implemented method of claim 15, wherein the query processing service is further configured to:

determine, based upon updating the user selection data maintained by the query processing service to include the user selection of a particular answer to the question about the client device from the subset of answers to the question about the client device from the plurality of answers to the question about the client device, whether the relevance data that specifies the relevance of each answer to the question about the client device from the plurality of answers to the question about the client device needs to be updated, and in response to determining, based upon updating the user selection data maintained by the query processing service to include the user selection of a particular answer to the question about the client device from the subset of answers to the question about the client device from the plurality of answers to the question about the client device, that the relevance data that specifies the relevance of each answer to the question about the client device from the plurality of answers to the question about the client device needs to be updated, then updating the relevance data that specifies the relevance of each answer to the question about the client device from the plurality of answers to the question about the client device.

* * * * *